Dec. 22, 1959 G. R. ASCHAUER 2,917,951
TRANSMISSION
Filed Aug. 10, 1954 4 Sheets-Sheet 1
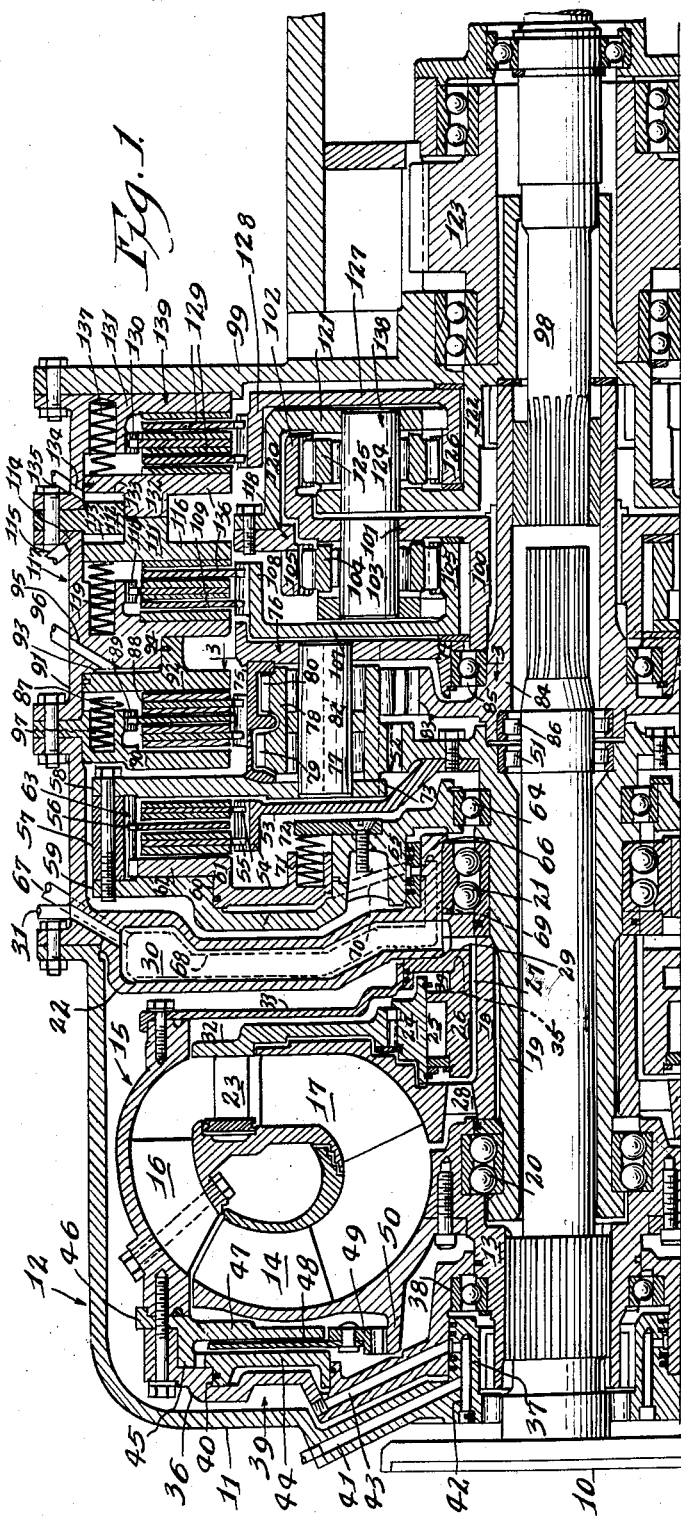
Inventor:
George R. Aschauer.
By John Darley
Attorney.

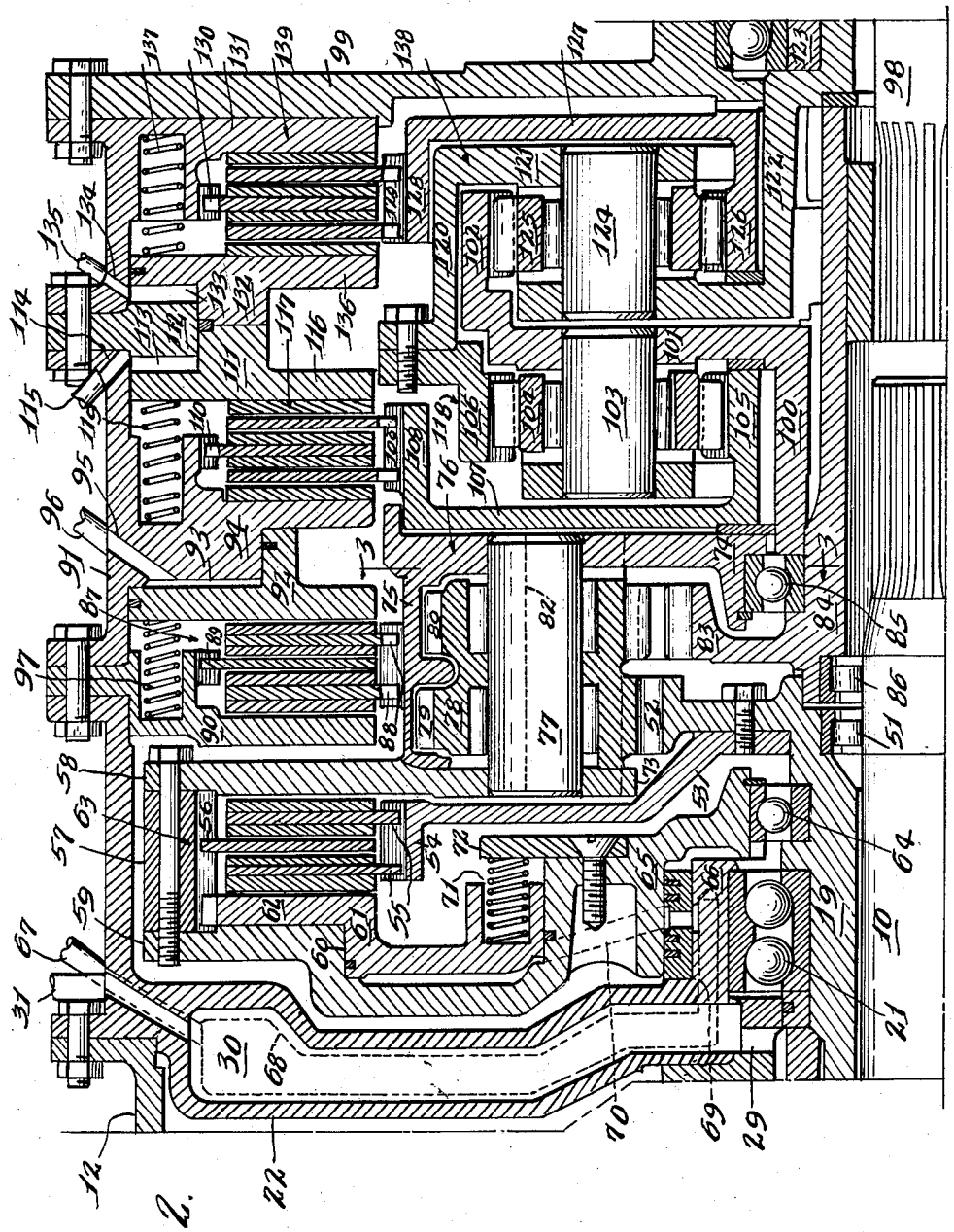

Dec. 22, 1959 G. R. ASCHAUER 2,917,951
TRANSMISSION
Filed Aug. 10, 1954 4 Sheets-Sheet 3
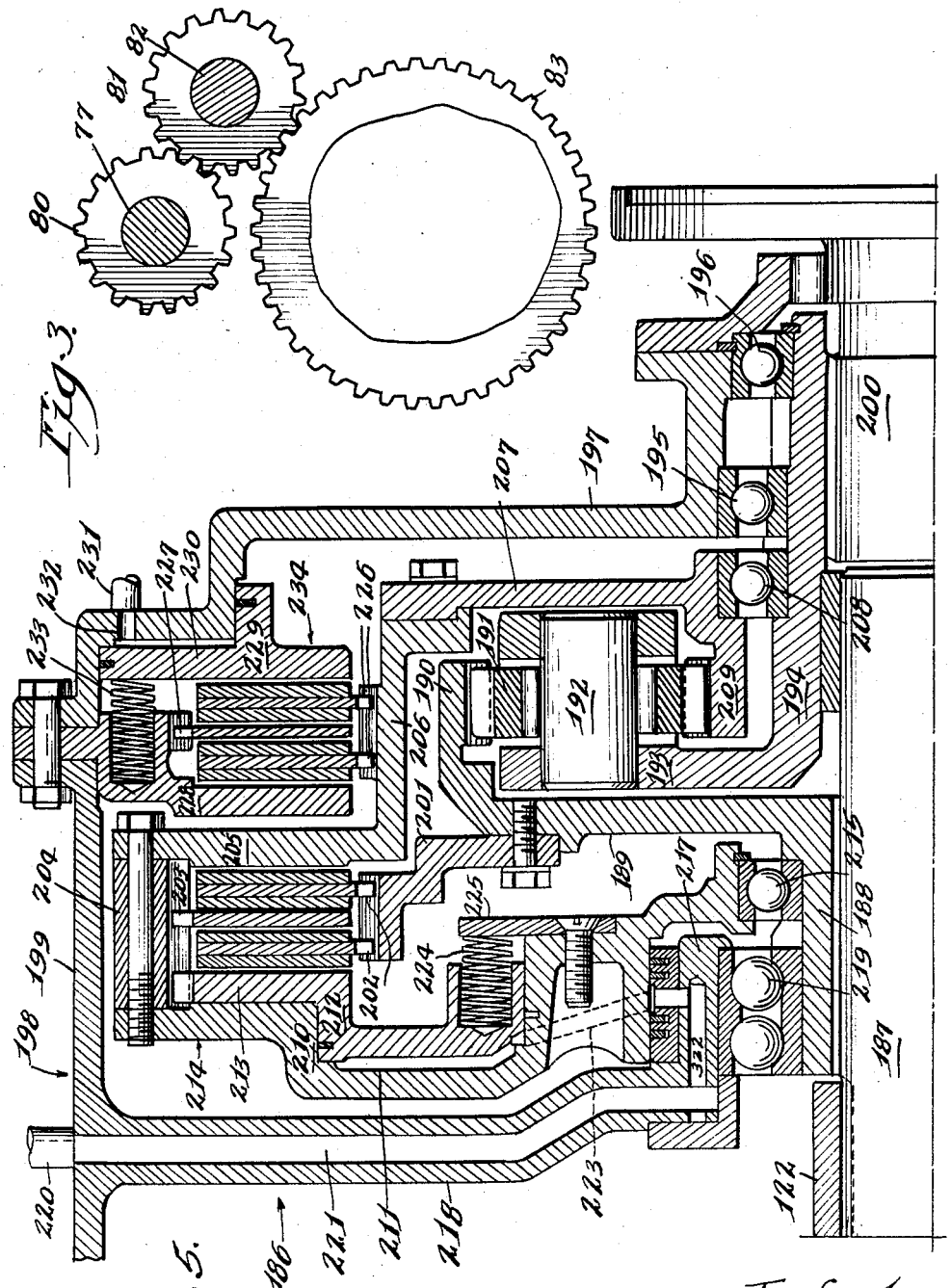
Inventor
George R. Aschauer.
By johnnie Darley
Attorney.

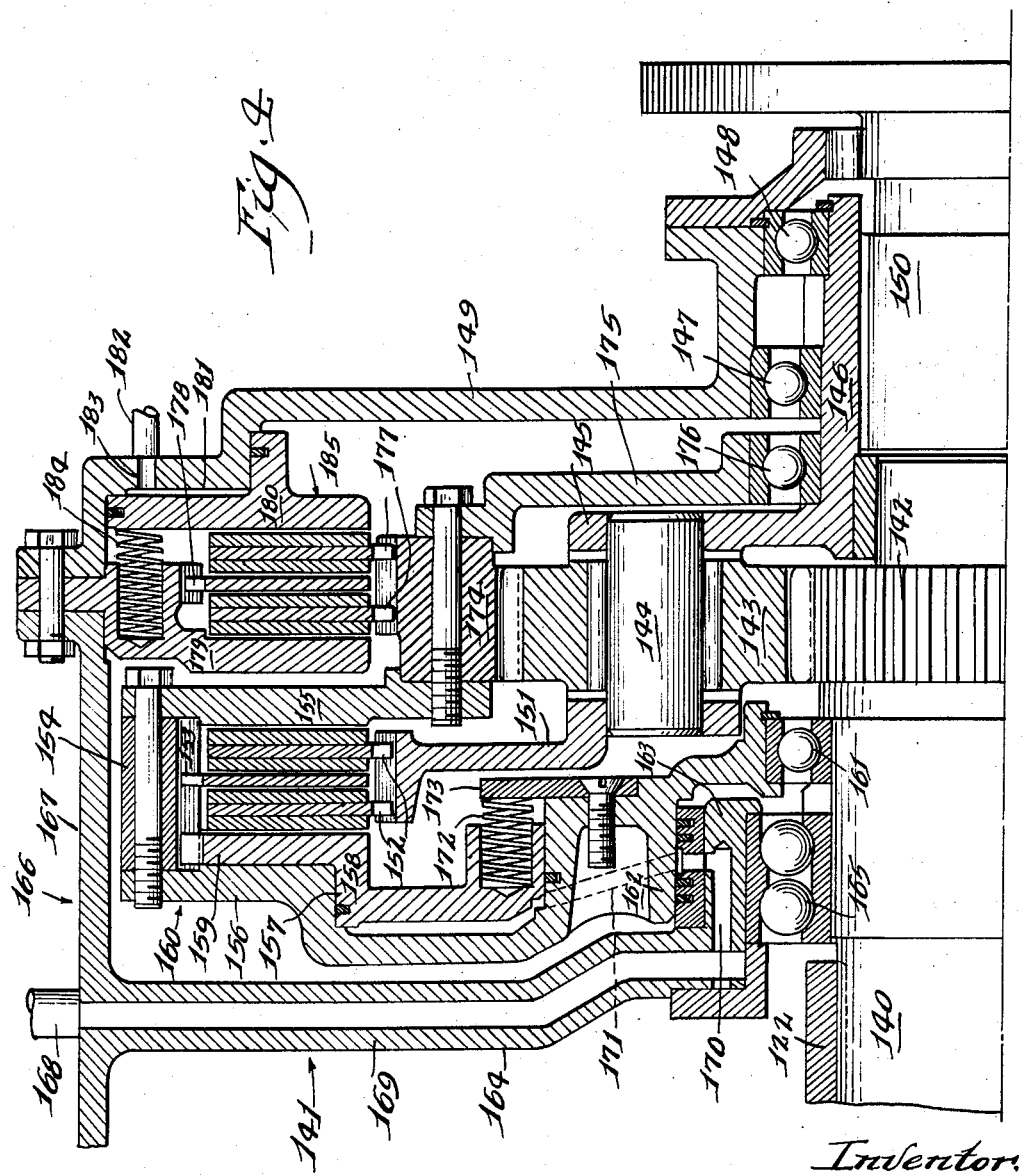

United States Patent Office 2,917,951
Patented Dec. 22, 1959

2,917,951

TRANSMISSION

George R. Aschauer, Racine, Wis., assignor to Twin Disc Clutch Company, Racine, Wis., a corporation of Wisconsin Application August 10, 1954, Serial No. 448,795

4 Claims. (Cl. 74—732)

My invention relates to transmissions for motor vehicles subjected to heavy duty service and more particularly to a device of this type for vehicles which are normally not employed in highway service.

Typical vehicles are crawler tractors, the so-called motor wagon including a coupled tractor and trailer each supported on two wheels and characteristically used in earth removal operations, and off-the-highway trucks which, for example, are used in mining operations of the open cut variety. Transmissions for such vehicles must possess ruggedness, a good husky construction, substantial torque multiplication, and capacity for variable-speeds within reasonable limits.

It is therefore one object of the invention to provide a transmission characterized by the above advantages and including a hydraulic torque converter and whose parts are so related as to produce a favorable overall length of the unit.

A further object is the provision of a multispeed transmission arranged for forward and reverse drive whose selection is determined by an hydraulically actuated, friction clutch and brakes similarly actuated which are of substantial size and employ relatively thick plates.

A further object is to provide a transmission of the character indicated in which the reverse drive brake and the brakes which effect speed changes are carried by the housing of the transmission that absorbs heat generated by the brakes and shock when the brakes are engaged.

A further object is the provision of a transmission as indicated wherein speed changes in either forward or reverse drive are effected through a selected one of a plurality of planetary gear sets which are juxtaposed in axial alignment and arranged in an approximately telescoped relation in that a part of each set is integral with a differently functional part of another set with an accompanying reduction in length of the whole gear set assembly and in number of the bearing supports.

A further object is to provide a transmission including planetary gear sets for effecting variant speeds which are so related that only that set which determines the selected speed is under load, the remaining set being free of load.

A further object is the provision of a transmission of the type indicated wherein the hydraulically actuated clutch and brakes are arranged so that when in release position, the oil in the clutch and brake cylinders is not subjected to a centrifugal head which otherwise would tend to engage the clutch and brakes.

These and further objects of the invention will be set forth in the following specification, reference being had to the accompanying drawings, and the novel means by which said objects are effectuated will be definitely pointed out in the claims.

In the drawings:

Fig. 1 is a fragmentary, sectional elevation showing a converter equipped transmission arranged for two speeds forward and reverse in either converter or direct drive, the clutch and brakes being shown in released position.

Fig. 2 is an enlarged, sectional elevation of the transmission aft of the converter as shown in Fig. 1.

Fig. 3 is a section along the line 3—3 in Figs. 1 and 2 showing the reverse gear train.

Figs. 4 and 5 are enlarged, sectional views of transmission units, either of which may be coupled to the output end of the transmission shown in Fig. 1 to provide additional speeds.

Referring to Fig. 1, the numeral 10 designates the input shaft of the transmission which connects with a source of power such as an internal combustion engine (not shown) and extends through an end wall 11 of, and into, a housing 12 which encloses the several mechanisms presently described.

Within the housing, the shaft 10 has a spline connection with a hub 13 journaled in the end wall 11 and secured to an impeller 14 forming part of a hydraulic torque converter 15. The outlet and inlet ends of the impeller 14 are operably related, respectively, to connected turbines 16 and 17 constituting first and second stages of the converter, the turbine 17 having a hub 18 which is splined to a quill shaft 19 that coaxially surrounds and is spaced from the input shaft 10. The forward and rear ends of the quill shaft 19 are journaled in bearings 20 and 21, respectively, mounted within the impeller hub 13 and in an intermediate housing wall 22 which extends transversely of the housing 12.

A reaction member 23 is located between the turbines 16 and 17 and the hub of this member has toothed connection with a ring 24. An overrunning clutch 25 of usual construction is interposed between the ring 24 and a cylindrical extension 26 attached to the central portion of the intermediate wall 22, the clutch 25 holding the reaction member 23 stationary during power transmission through the converter and permitting this member to rotate freely with the impeller 14 and turbines 16 and 17 during direct drive as presently explained.

The extension 26 encircles and is spaced from the turbine hub 18 to define an annular space 27 whose forward end communicates through one or more ports 28 in the hub 18 with the interior of the converter 15, while the rear end connects through a radial port 29 in the extension 26 with the inner end of a radial passage 30 in the wall 22 whose outer end connects with a pipe 31. The latter pipe constitutes the inlet for the working oil supplied to the converter and, externally of the housing 12, normally forms part of a hydraulic system including a pump, a cooler and a pressure controlling device whereby the oil is continuously circulated through the converter at constant pressure, none of these parts forming part of the invention and hence are not illustrated, but all of which are well known in the art. The discharge from the converter 15 flows just outwardly of the bladed part of the reaction member 23 into an annular space 32 included between the adjacent, annular portion of the reaction member 23 and a rear, annular, cover plate 33 whose outer periphery is attached to the turbine 16 and whose inner periphery has appropriate sealing contact with the extension 26. The inner portion of the space 33 connects through an annular pocket 34 with a passage 35 in the outer surface of the extension. The latter passage is shown broken off for simplicity, but it will be understood that it in turn communicates with a radial passage (not shown) in the wall 22 and angularly displaced from the passage 30 for inclusion in the converter-cooler circuit mentioned above.

The forward end of the converter 15 is closed by an annular cover plate 36 of irregular section whose outer periphery is attached to the turbine 16 while the inner periphery has sealing contact with a cylindrical extension 37 integral with the end wall 11, and projects internally of the housing 12, and is journaled on a bearing 38 carried by the impeller hub 13.

The forward cover plate 36 is utilized as a partial support for a lockup clutch, designated generally by the numeral 39, whose engagement positively connects the impeller 14 and turbines 16 and 17 for direct drive through the converter elements and at which time, the reaction member 23 is freed by the overrunning clutch 25.

Specifically, the side of the cover plate 36 which faces the converter 15 is annularly recessed at an appropriate mean radius to form an annular cylinder 40 which is coaxial with the input shaft 10 and to which oil under pressure control is admitted whenever desired through successively connecting passages 41, 42 and 43, respectively, provided in the end wall 11, extension 37 and cover plate 36. An annular piston 44 is slidable in the cylinder 40 and its outer periphery has toothed sliding engagement with an annular shoulder 45 provided on an annular plate 46 whose outer portion is clamped between the cover plate 36 and the adjacent part of the turbine 16 and whose radially inward portion is shaped as a flat, annular abutment 47. An annular, friction plate 48 is positioned between the piston 44 and abutment 47 and its inner portion is riveted to a ring 49 having toothed and sliding engagement with an annular offset 50 carried by the impeller 14.

A constant pressure of about 50 p.s.i., by way of example, is maintained in the converter and since this pressure exists in all regions between the cover plates 33 and 36, it constantly tends to move the piston 44 to the release position shown and does so move this piston when pressure in the cylinder 40 is cut off. Under this condition, power flow is through the converter 15 with the usual torque multiplication, but if direct drive is desired, pressure is established in the cylinder 40 having a value substantially higher than the converter pressure to thereby engage the lockup clutch 39 and cause the impeller 14 and turbines 16 and 17 to rotate at the same or engine speed and hence without torque multiplication. Since power is not then being transmitted through the working oil of the converter and all parts are rotating at substantially the same speed, the power losses in the converter are negligible. Actually, the reaction member 23 rotates at a slightly lower speed than the impeller and turbines due to the drag of the overrunning clutch, but the difference is small.

Power available through converter 15 or in direct drive, may be utilized for either forward or reverse movement of the vehicle with a high or low speed selectivity in either direction, plus a power takeoff feature, according to the following arrangements.

The rear end of the quill shaft 19 (see Fig. 2) carries a bearing 51 in which the adjacent end of the input shaft 10 is piloted and is also provided with a gear 52 which is coaxial with the shaft 19 and meshes with a gear presently described. The inner portion of an annular plate 53 is secured to the web of the gear 52 and its outer periphery is toothed at 54 for driving and relative axial sliding engagement with a pair of spaced clutch plates 55—55 between which is positioned a clutch plate 56 whose outer periphery has toothed and relative sliding engagement with an annulus 57 which spaces and is clamped between an annular plate constituting an abutment 58 and an annular plate 59 of irregular section. The latter plate is shaped to provide an annular cylinder 60 in which is slidable an annular piston 61 having an outwardly extending, flat portion serving as a pressure plate 62 which lies in opposed relation to the adjacent clutch plate 55 and whose outer periphery has toothed and sliding engagement with the annulus 57. The plates 55, 56 and 62 and the abutment 58 constitute the forward drive clutch 63.

The radially inner part of the plate 59 is journaled on a bearing 64 carried by the quill shaft 19 and adjacent thereto, the plate 59 is provided with an offset cylindrical shell 65 which encircles and has sealing contact with a similar shell 66 offset from the intermediate wall 22 and within which is fitted the outer race of the bearing 21.

Oil under pressure for actuating the forward drive clutch 63 passes through a pipe 67 which forms part of a suitable, external hydraulic circuit of known characteristics whereby oil pressure may be established in the pipe under regulation as desired. The pipe 67 communicates constantly with the cylinder 60 successively through a generally radial passage 68 in the wall 22 which is angularly displaced from the passage 30, and passages 69 and 70 in the shell 66 and plate 59, respectively. When pressure to the cylinder 60 is interrupted, the piston 61 is returned to the release position shown by means of a plurality of springs 71 circumferentially spaced around the piston and interposed therebetween and a ring 72 attached to the plate 59.

From the foregoing, it will be understood that, when the forward drive clutch 63 is engaged, then during either converter or direct drive, the entire assemblage including this clutch and importantly a radially inward extension of the abutment 58, designated as a wall 73, rotates with the quill shaft 19.

Axially spaced from the wall 73 is a second wall 74 which joins therewith by means of an annular connector 75, the latter being united with the wall 74 adjacent the outer periphery thereof. The walls 73 and 74 and connector 75 constitute an annular carrier 76 and bridged between these walls are a plurality of pins 77, only one being shown, which are spaced circumferentially around the carrier 76 and on each of which is journaled a sleeve 78. The forward end of each sleeve 78 carries a gear 79 which constantly meshes with the gear 52 while the rear end of each sleeve carries a gear 80 which constantly meshes with a companion idler gear 81 (see Fig. 3) journaled on a pin 82 that is bridged between the walls 73 and 74. A plurality of the idler gears 81 are appropriately spaced around the carrier 76 and they constantly mesh also with a gear 83 formed as part of a quill shaft 84. The inner portion of the rear carrier wall 74 is journaled on a bearing 85 carried by the quill shaft 84 whose forward end is journaled on a bearing 86 through which the input shaft 10 also extends in piloting relation.

The assembly including the carrier 76, gears 79 and 80, and the gears 52 and 83 constitute a spur type, planetary gear train in which the two latter gears are sun gears and the gears 79 and 80 have planet characteristics.

Surrounding the carrier 76 and aligned therewith transversely of the housing 12 is an annular, reverse brake generally designated by the numeral 87. This brake includes spaced plates 88—88 whose inner portions have toothed and relative sliding engagement with the connector 75 and interposed between the plates 88 is a plate 89 whose outer periphery has toothed and relative sliding engagement with part of an abutment plate 90 which extends radially inward from and is fast to the surrounding wall 91 of the housing 12. The several plates of the reverse brake 87 are engaged by an annular piston 92 which is shaped to define an annular cylinder 93 with an annular fixed wall 94 also extending inwardly from the housing wall 91. A passage 95 in the wall 94 connects the cylinder 93 with an external pipe 96 forming part of the aforesaid external hydraulic circuit whereby pressure under regulated and selected conditions is applied to engage the reverse brake 87. Release of the reverse brake plates when pressure is interrupted is provided by a plurality of springs 97 interposed between the abutment plate 90 and piston 92.

So far as described, it will be apparent that with the forward drive clutch 63 engaged and the reverse brake 87 released, the carrier 76 and its enclosed gear train rotates as a unit so that the quill shaft 84 rotates in the same direction as the quill shaft 19 which is forward for the vehicle. However, when the forward drive clutch 63 is released and the reverse brake 87 is engaged, the carrier 76 is immobilized so that the gear 52 then drives through the gears 79 and 80, idler gears 81 and gear 83 to impart an opposite rotation of the quill shaft 84 which is reverse for the vehicle.

The rear end of the quill shaft 84 is internally splined to one end of a power takeoff shaft 98 which extends through the rear end wall 99 of the housing 12 for driving auxiliary equipment and which can be rotated in either direction depending upon whether the forward clutch 63 or the reverse brake 87 is engaged.

High and low speed ranges are provided in the transmission which are selectable under either a forward or reverse drive condition. These ranges are effected through a novel arrangement of planetary gear sets which are related in what might be termed telescopic intimacy and so that power drive through one set to establish one speed range does not impose any load on the other gear set.

The quill shaft 84 is exteriorly splined for driving connection with a sleeve 100 which carries at the rear end thereof an outwardly extending, annular, planet carrier 101 whose outer rear portion is extended rearwardly to provide a ring gear 102 which is coaxial with a quill shaft 100. Suitably mounted in the carrier 101 is a plurality of circumferentially spaced pins 103 on each of which is journaled a planet pinion 104 that constantly meshes with a sun gear 105 and a ring gear 106.

The sun gear 105 is formed on the inner wing of an annular channel member 107 whose outer wing 108 lies outwardly of the ring gear 106 and is peripherally toothed for engagement with spaced, annular plates 109—109 between which is positioned a cooperating, annular plate 110 that is exteriorly toothed for relative sliding engagement with a convenient portion of the fixed wall 94. The plates 109 and 110 are engaged against the wall 94 as an abutment by means of an annular piston 111 which is related to the housing wall 91 and a fixed annular wall 112 extending inwardly therefrom to form an annular cylinder 113 which communicates through a passage 114 in the housing wall 91 with an external pipe 115 through which pressure may be supplied to the cylinder 113 as desired. The piston 111 includes an inwardly extending portion constituting a pressure plate 116 and this plate plus the plates 109 and 110 and the piston 111 form the high speed brake 117 of the transmission whose engagement determines operation of the high speed train 118 including the planet pinions 104, sun gear 105 and ring gear 106. Release of this brake is effected by a plurality of springs 119 interposed between the fixed wall 94 and the piston 111.

The ring gear 106, which constitutes the output of the high speed gear train 118, is secured to an annular shell 120 which is coaxial with the quill shaft 84 and connects with the rear end of an inwardly extending, planet pinion carrier 121 which is also coaxial with the quill shaft 84. The forward inner portion of the carrier 121 connects with a sleeve member 122 which is coaxial with and spaced from the quill shaft 84 and extends outwardly through the end wall 99 for driving connection with a pinion 123 that may be conventionally connected with the driving axle of the vehicle.

A plurality of circumferentially spaced pins 124 are mounted in the carrier 121 and on each is journaled a planet pinion 125 that constantly meshes with the ring gear 102 and with a sun gear 126 formed on the inner wing of a channel member 127 whose web lies transversely of the housing 12. The outer wing 128 of the member 127 lies outwardly of the shell 120 and is toothed for relative sliding engagement with the inner edges of spaced, annular, plates 129—129 between which is positioned a similar plate 130 whose outer periphery has toothed and sliding engagement with a convenient part of an annular fixed wall 131 which extends inwardly from the housing wall 91 and which serves as an abutment for the plates 129 and 130. These plates are engaged by a piston 132 which is located on the opposite side of the fixed wall 112 from the piston 111 and is shaped to define with this wall and the wall 91 an annular cylinder 133 which communicates through a passage 134 in the wall 91 with an external pipe 135 forming part of a hydraulic circuit for admitting pressure to the cylinder under appropriate control. The piston 132 includes an annular pressure plate 136 which engages the plates 129 and 130 when pressure is applied to the piston and release thereof is effected by a plurality of springs 137 interposed between the fixed wall 131 and the piston 132.

From the foregoing, it will be understood that the ring gear 102, planet pinions 125 and sun gear 126 constitute the low speed gear train 138 of the transmission whose operation is determined by engagement of the low speed brake 139 including the plates 129 and 130. Further, the high and low speed brakes 117 and 139 are disposed around, and substantially in alignment transversely of the transmission with, the high and low speed gear trains 118 and 138, all respectively, which is a factor in reducing the overall length of the transmission. Moreover, the planet carrier 101 of the high speed train 118 also connects with the ring gear 102 of the low speed train 138, while the planet carrier 121 of the low speed train 138 connects with the ring gear 106 of the high speed train 118.

In describing the operation of the transmission, it will be assumed that the vehicle is started with converter, forward, low speed drive. The lockup clutch 39 is then disengaged, as is also the reverse and high speed breaks 87 and 117, respectively, while the forward clutches and low speed brake 63 and 139, respectively, are engaged.

Power flow is then through the converter 15 with torque multiplication and, since the forward clutch 63 is engaged, the carrier 76 rotates with the gear 52 so that forward drive is imparted through the several gears carried by this carrier to the gear 83 and thence through the carrier 101 to the ring gear 102 which constitutes the input side of the low speed train 138. The sun gear 126 being held against rotation by engagement of the low speed brake 139, power output from the low speed train 138 is through the pinion carrier 121 to the sleeve member 122 and thence to the pinion 123. During this operation, it will be obvious that the gears and pinions of the high speed train 118 are free to rotate with respect to each other and are not under load.

To shift from low to high speed, the low speed brake 139 is disengaged and the high speed brake 117 is engaged while the forward clutch 63 remains engaged. Forward drive to the gear 83 is effected as stated above and thence to the pinion carrier 101 which constitutes the input to the high speed train 118. Since the sun gear 105 is held against rotation by the brake 117, power output from the high speed train 118 is through the ring gear 106 to the pinion carrier 121 and thence to the sleeve member 122 and pinion 123. During this operation, the pinions and gears of the low speed train 138 are free to rotate with respect to each other and are not under load.

High and low speeds are also available for reverse drive and for this purpose, the forward clutch 63 is disengaged and the reverse brake 87 is engaged to thereby hold the carrier 76 against rotation as well as the forward drive cylinder 60 and associated parts of the forward clutch 63 except the clutch plates 55 which rotate with the gear 52. Power drive from the latter gear is then through the gears 79 and 80 and idler gears 81 to thereby set up a reverse rotation of the gear 83. Speed selection can then be determined by engaging either the low speed brake 139 or the high speed brake 117 to effect power drives through either the low or high speed trains 138 or 118, all respectively, in the manner described above. Engagement of the reverse brake 87 also sets up a reverse rotation of the power takeoff shaft 98.

An important feature is that, with the reverse brake 87 engaged and the forward clutch 63 disengaged, the cylinder 60 of the latter is held against rotation so that a centrifugal hydraulic head cannot be established in this cylinder which would otherwise tend to engage the forward clutch 63 and which would require relatively heavy springs to counteract. With this construction, dependable release of the forward clutch 63 can be effected with relatively light springs that are few in number by comparison.

For direct drive, either forward or reverse and through either of the speed trains and also through the power take-off shaft 98, the lockup clutch 39 is engaged by applying a pressure to the piston 44 that is substantially higher than the constant pressure in the converter 15. The impeller 14 and turbines 16 and 17 are then locked together and power is transmitted direct from the engine without torque multiplication in the converter to the quill shaft 19, and subsequent handling of this power depends upon selective operation of the clutch 63 and the brakes 87, 117 and 139 as described above.

The above construction provides a compact design for a two speed, forward or reverse, converter or direct drive transmission, particularly with reference to the length thereof. The reverse, high and low speed brakes 87, 117 and 139, respectively, are disposed around the associated gear trains so that relatively large diameter, thick plates may be used for these brakes. An additional feature is that the latter brakes are carried by the transmission housing 12 which not only provides satisfactory heat transference thereto, but a substantial absorption of jerk energy when any of the indicated brakes is engaged. Further, the cylinders 93, 113 and 133 to which pressure oil is fed to engage the reverse, high and low speed brakes 87, 117 and 139 are never subjected to a motion of rotation so that a centrifugal head of oil cannot be set up in these cylinders tending to engage the associated brakes when in a disengaged position. Release may therefore be effected with relatively light springs.

A further feature is the substantially telescoped relation of the high and low speed trains 118 and 138, respectively, which contributes to shortening the length of the transmission. For example, the pinion carrier 101 of the high speed train 118 includes an extension that constitutes the ring gear 102 of the low speed train 138, while the pinion carrier 121 of the low speed train 138 includes an extension which constitutes the ring gear 106 of the high speed train 118. The pinions and gears of either train are under load only when transmitting power.

In Figs. 4 and 5 are shown appendage transmission units, either of which may be connected to the output end of the transmission shown in Fig. 1 to provide two additional speeds so that the complete transmission would then be conditioned for four speeds, forward or reverse, and converter or direct drive.

Referring to Fig. 4, the output end of the sleeve member 122 (see Figs. 1 and 2) is drivingly connected to one end of a coaxial shaft 140 which serves as the input to the transmission unit generally designated by the numeral 141. Adjacent its other end, the shaft 140 carries a sun gear 142 which constantly meshes with a plurality of planet pinions 143 suitably disposed around the shaft and each of which is journaled on a pin 144 mounted in the opposite sides of an annular carrier 145 whose rear side connects with a sleeve 146 journaled in bearings 147 and 148 mounted in the rear end wall 149 of the unit 141. The adjacent end of the shaft 140 is piloted in the sleeve 146 which in turn is splined to a coaxial output shaft 150 that is suitably connected to the driving axle of the vehicle.

The forward side of the carrier 145 connects with an annular plate 151 whose outer periphery is toothed for engagement with spaced clutch plates 152—152 between which is located a clutch plate 153 whose outer periphery is toothed for engagement with an annulus 154. The latter is clamped between an annular plate 155 constituting an abutment and an annular plate 156 having an irregular section. The plate 156 is shaped to provide an annular cylinder 157 in which is slidable an annular piston 158 having an outwardly extending, annular, flat portion which acts as a pressure plate 159 for the clutch plates 152 and 153 and whose outer periphery is toothed for engagement with the annulus 154. The plates 152, 153 and 159 and the abutment plate 155 constitute a clutch 160 for determining high speed through this transmission unit.

The radially inward part of the plate 156 is journaled on a bearing 161 which encircles the input shaft 140 and outwardly adjacent thereto, the plate 156 is provided with an offset, cylindrical shell 162 which encircles and has sealing contact with a similar shell 163 offset from a transverse wall 164 and within which is fitted the outer race of a bearing 165 that provides journal support for the input shaft 140. The wall 164 forms part of a housing 166 for the unit which additionally includes a surrounding wall 167 and the end wall 149. The housing 166 is suitably connected to the end wall 99 of the housing 12 (see Figs. 1 and 2) or may be otherwise attached to the latter housing.

Oil under pressure for actuating the high speed clutch 160 passes through a pipe 168 which forms part of the external hydraulic circuit above referred to and this pipe communicates constantly with the cylinder 157 successively through a generally radial passage 169 in the wall 164 and passages 170 and 171 in the shell 163 and plate 156, respectively. When pressure to the cylinder 157 is interrupted, the piston 158 is returned to the release position shown by a plurality of springs 172 circumferentially spaced around the piston and interposed therebetween and a ring 173 attached to the plate 156.

A ring gear 174 is clamped between the abutment plate 155 and an annular plate 175 which extends radially inward from the annulus and is journaled on a bearing 176 carried by the sleeve 146. The ring gear 174 constantly meshes with the planet pinions 143 and its outer periphery is toothed for engagement with a pair of spaced annular plates 177—177 between which is positioned an annular plate 178 whose outer periphery is toothed for engagement with a similarly arranged portion of an annular abutment plate 179 that is fast to and extends radially inward from the housing wall 167.

The plates 177 and 178 are engaged by an annular piston 180 which is complementarily shaped relative to the housing walls 149 and 167 to define therewith an annular cylinder 181. Pressure is supplied to this cylinder through a pipe 182 forming part of the noted external hydraulic circuit and a passage 183 in the wall 149. Release of the piston 180 to the position shown in Fig. 4 is effected by a plurality of springs 184 circumferentially spaced around the piston and interposed therebetween and the abutment plate 179. The plates 177 and 178 and allied parts constitute the low speed brake 185 of the transmission unit 141.

In describing the operation of this unit, it will be assumed that the sleeve member 122 is rotating in either a forward or reverse direction at a speed determined by either of the gear trains 118 and 138 and that it is desired to utilize low speed drive through the unit 141. For this purpose, the low speed brake 185 is engaged, the high speed clutch 160 being disengaged, so that the ring gear 174 is grounded or held against rotation and power flow is from the sun gear 142 as a driving member through the planet pinions 143 to the carrier 145 as a driven member.

For high speed, the low speed brake 185 is disengaged and the high speed clutch 160 is engaged so that the ring gear 174 and the carrier 145 are locked together for rotation around the input shaft 140 with the carrier operating as the driven member.

The transmission unit 141 is characterized by the same advantages as the transmission shown in Figs. 1 and 2 relative to the carriage of the low speed brake 185 by the housing 166 and absorption thereby of brake generated heat and shocks when this brake is engaged. Further, there is an absence of centrifugal head on the oil in the cylinders of the high speed clutch 160 and low speed brake 185 when released which would otherwise tend to engage this clutch and brake, thus permitting the use of light release springs. In this connection, it will be noted that, when the high speed clutch 160 is released and the low speed brake 185 is engaged, the assembly including the plate 156, abutment plate 155 and the parts included therebetween come to rest.

In considering the advantages of a transmission as shown in Figs. 1 and 2 when coupled with the unit shown in Fig. 4, it will be apparent that four speed changes in forward or reverse are available to thereby substantially enhance the operating flexibility of the overall transmission. The speed ratios of the high speed train 118 and of the high speed train determined by engagement of the high speed clutch 160 are different from each other as are the speed ratios of the low speed train 138 and of the low speed train determined by engagement of the low speed brake 185. The speed ratios in each train may be varied to suit operating requirements of the particular vehicle, i.e., a speed ratio may be up, or down, or may not effect any change, such as a 1:1 ratio.

For example, if we designate the high speed train 118 by the symbol $HI_1$ and ascribe to it a ratio of 1.5 up, the high speed train determined by engagement of the clutch 160 by the symbol $HI_2$ with a ratio of 1:1, the low speed train 138 by the symbol $LO_1$ with a ratio of 1.5 down, and the low speed train determined by the engagement of the brake 185 by the symbol $LO_2$ with a down ratio of 4.0, the following combinations are possible by coupling the indicated trains in pairs for power flow:

$HI_1 \times HI_2 = 1.5$ up $\times 1:1 = 1.5$ up
$LO_1 \times HI_2 = 1.5$ down $\times 1:1 = 1.5$ down
$HI_1 \times LO_2 = 1.5$ up $\times 4.0$ down $= 2.66$ down
$LO_1 \times LO_2 = 1.5$ down $\times 4.0$ down $= 6.00$ down The foregoing provides an overall range of $6 \times 1.5$ or 9 with the transmission unit 141 providing a 4:1 ratio down.

Referring to Fig. 5, there is illustrated a variant form of transmission unit, designated by the numeral 186, which may be coupled to the output end of the transmission shown in Figs. 1 and 2 to also provide four speeds forward and reverse, but in which the speed variations are different. Generally speaking, this unit differs from that shown in Fig. 4 in that power input to the planetary gear train, whose control determines whether the output speed in the unit 186 is high or low, is through the ring gear of this train rather than through the sun gear as in Fig. 4.

The output sleeve member 122 of the Fig. 1 transmission is keyed to an input shaft 187 that in turn is splined to an encircling sleeve 188 having a transverse, annular flange 189 which terminates in a ring gear 190. The latter meshes constantly with a plurality of planet pinions 191 each of which is journaled on a pin 192 bridged between opposite sides of an annular carrier 193 having a sleeve 194 coaxial with and within which the inner end of the input shaft 187 is piloted. The sleeve 194 is journaled in bearings 195 and 196 mounted in the end wall 197 of the unit housing 198 which also includes a surrounding wall 199, and the sleeve 194 further has spline connection with an output shaft 200.

The flange 189 carries an annular ring 201 whose periphery is toothed for engagement with a pair of spaced clutch plates 202—202 between which is positioned a clutch plate 203 whose outer periphery is toothed for engagement with an annulus 204. The plates 202 and 203 are clamped as presently described against an abutment plate 205 which carries an annular shell 206, peripherally toothed on its exterior, which connects with an annular plate 207 disposed rearwardly of the carrier 193 and journaled on a bearing 208 interposed therebetween and the sleeve 194. The inner end of the plate 207 extends forwardly and is arranged as a sun gear 209 which constantly meshes with the planet pinions 191. The ring gear 190, pinions 191 and sun gear 209 constitute parts of a planetary gear train whose speed ratios are determined by a clutch and brakes presently described.

The annulus 204 is clamped between the abutment plate 205 and an annular plate 210 having an irregular section which is shaped to provide an annular cylinder 211 in which is slidable an annular piston 212. Extending radially outward from the piston 212 is an annular, flat portion which acts a pressure plate 213 for the clutch plates 202 and 203 and whose outer periphery is toothed for engagement with the annulus 204. The plates 202, 203 and 213 and the abutment plate 205 constitute a clutch 214 for determining high speed through this transmission unit.

The radially inward part of the plate 210 is journaled on a bearing 215 which encircles the sleeve 188 and outwardly adjacent thereto, the plate 210 includes an offset, annular shell 216 which encircles and has sealing contact with a similar shell 217 offset from a transverse wall 218 and within which is fitted the outer race of a bearing 219 that encircles the sleeve 188. The wall 218 forms part of the housing 198 and extends inwardly from the wall 199 thereof and the housing 198 is suitably connected to the end wall 99 of the housing 12 (see Figs. 1 and 2) or may be otherwise attached to the latter housing.

Oil under pressure for actuating the high speed clutch 214 passes through a pipe 220 which forms part of the external hydraulic circuit above referred to and this pipe communicates constantly with the cylinder 211 successively through a generally radial passage 221 in the wall 218 and passages 222 and 223 in the shell 217 and plate 210, respectively. When pressure to the cylinder 211 is interrupted, the piston 212 is returned to the release position shown by a plurality of springs 224 circumferentially spaced around the piston and interposed therebetween and a ring 225 attached to the plate 210.

The toothed portion of the shell 206 engages with the inner, toothed peripheries of a pair of spaced, annular plates 226—226 between which is located a plate 227 whose outer periphery is toothed for engagement with a similarly arranged portion of an annular, abutment plate 228 that is fast to and extends radially inward from the housing wall 199.

The plates 226 and 227 are engaged by an annular piston 229 which is complementarily shaped relative to the housing walls 197 and 199 to define therewith an annular cylinder 230. Pressure is supplied to this cylinder through a pipe 231 forming part of the noted external hydraulic circuit and a passage 232 in the wall 197. Release of the piston 230 to the position shown in Fig. 5 is effected by a plurality of springs 233 circumferentially spaced around the piston and interposed therebetween and the abutment plate 228. The plates 226 and 227 and allied parts constitute the low speed brake 234 of the transmission unit 186.

In describing the operation of this unit, it will be assumed that the sleeve member 122 is rotating in either a forward or reverse direction at a speed determined by either of the gear trains 118 and 138 and that it is desired to utilize low speed drive through the unit 186. For this purpose, the low speed brake 234 is engaged, the high speed clutch 214 being disengaged, so that the shell 206 and hence the sun gear 209 is grounded or held against rotation and power flow is from the ring gear 190 as a driving member through the planet pinions 191 to the carrier 193 as a driven member.

For high speed, the low speed brake 234 is disengaged and the high speed clutch 214 is engaged so that the ring gear 190 and the sun gear 209 are locked together for rotation with the sleeve 188 around the input shaft 187 so that the carrier 193 operates as the driven member.

The transmission unit 186 is characterized by the same advantages as the transmission shown in Figs. 1 and 2 relative to the carriage of the low speed brake 234 by the housing 198 and absorption thereby of clutch generated heat and shocks when this clutch is engaged. Further, there is an absence of centrifugal head on the oil in the cylinders of the high speed clutch 214 and low speed brake 234, when released which would otherwise tend to engage this clutch and brake, thus permitting the use of light release springs. In this connection, when the high speed clutch 214 is released and the low speed brake 234 is engaged, the assembly including the plate 210, abutment plate 205 and the parts included therebetween come to rest.

In considering the advantages of a transmission as shown in Figs. 1 and 2 when coupled with the unit shown in Fig. 5, it will be obvious that four speed changes in forward or reverse are available to thereby substantially enhance the flexibility of the complete transmission. The speed ratios of the high speed train 118 and of the high speed train determined by engagement of the high speed clutch 214 may be different from each other as may be the speed ratios of the low speed train 138 and of the low speed train determined by engagement of the low speed brake 234. The speed ratios in each train may be varied as conditions may require with respect to any particular vehicle, i.e., a speed ratio may be up, or down, or may not effect any change, such as a 1:1 ratio.

For example, if we designate the high and low speed trains 118 and 138 in the transmission shown in Figs. 1 and 2 by the symbols $HI_1$ and $LO_1$ with ratios of 1.5 up and 1.5 down, all respectively, the high speed train determined by engagement of the clutch 214 by the symbol $HI_3$ with a ratio of 1:1, and the low speed train determined by engagement of the brake 234 by the symbol $LO_3$ with a down ratio of 1.5, the following combinations are possible by coupling the indicated trains in pairs for power flow:

$$HI_1 \times HI_3 = 1.5 \text{ up} \times 1:1 = 1.5 \text{ up}$$
$$HI_1 \times LO_3 = 1.5 \text{ up} \times 1.5 \text{ down} = 1:1$$
$$LO_1 \times HI_3 = 1.5 \text{ down} \times 1:1 = 1.5 \text{ down}$$
$$LO_1 \times LO_3 = 1.5 \text{ down} \times 1.5 \text{ down} = 2.25 \text{ down}$$

The foregoing provides an overall range of $1.5 \times 2.25$ or 3.37, with the transmission unit 186 providing a 1.5:1 ratio down.

In each instance where the Fig. 1 transmission is coupled to either of the transmission units 141 or 186, a selected gear train in the Fig. 1 transmission is connected in series relation with a gear train in one of the appendage transmission units.

I claim:

1. A transmission comprising a housing having a surrounding wall provided with axially spaced and inward, annular abutments, an input member and an output member extending from opposite ends of the housing, respectively, an internal, planetary gear train including a ring gear, a sun gear, planet pinions and a pinion carrier, means connecting the ring gear to the output member, an annular brake carried by the transmission wall in surrounding and substantially coplanar relation to the internal gear train and being connected to the sun gear thereof by an annular channel member in which the internal gear train is partly housed, a spur planetary gear train positioned forward of the internal gear train including an input sun gear and an output sun gear respectively connected to the input member and to the internal train carrier, sleeve planet pinions meshing at one end with the input sun gear, idler gears meshing with the opposite ends of the sleeve pinions and the output sun gear, and an annular carrier in which the sleeve pinions and idler gears are mounted and partly housed, and a forward clutch and a reverse brake respectively hydraulically actuated and selectively engageable to respectively cause the spur train carrier to rotate with the input sun gear to provide forward drive through the internal planetary train and to hold the spur train carrier against rotation to provide reverse drive through the internal planetary train, the forward clutch including an annular cylinder journaled in the housing and connected to the spur train carrier and an annular, clutch engaging piston slidable in the cylinder and the reverse brake surrounding the spur train in substantially coplanar relation thereto and being carried by the transmission wall, the annular brake comprising friction plates respectively slidably connected to the wall and the channel member and engageable to grip the plates thereof against one of the abutments and the reverse brake comprising friction plates respectively slidably connected to the wall and the spur train carrier and engageable to grip the plates thereof against the other abutment.

2. A transmission comprising a housing having a surrounding wall provided with axially spaced and inward, annular abutments, an input member and an output member extending from opposite ends of the housing, respectively, an internal, planetary gear train including a ring gear, a sun gear, planet pinions and a pinion carrier connected to the outut member, an annular brake carried by the transmission wall in surrounding and substantially coplanar relation to the internal gear train and being connected to the sun gear thereof by an annular channel member in which the internal gear train is partly housed, a spur planetary gear train positioned forward of the internal gear train including an input sun gear and an output sun gear respectively connected to the input member and to the internal train carrier, sleeve planet pinions meshing at one end with the input sun gear, idler gears meshing with the opposite ends of the sleeve pinions and the output sun gear, and an annular carrier in which the sleeve pinions and idler gears are mounted and partly housed, and a forward clutch and a reverse brake respectively hydraulically actuated and selectively engageable to respectively cause the spur train carrier to rotate with the input sun gear to provide forward drive through the internal planetary train and to hold the spur train carrier against rotation to provide reverse drive through the internal planetary train, the forward clutch including an annular cylinder journaled in the housing and connected to the spur train carrier and an annular, clutch engaging piston slidable in the cylinder and the reverse brake surrounding the spur train in substantially coplanar relation thereto and being carried by the transmission wall, the annular brake comprising friction plates respectvely slidably connected to the wall and the channel member and engageable to grip the plates thereof against one of the abutments and the reverse brake comprising friction plates respectively slidably connected to the wall and the spur train carrier and engageable to grip the plates thereof against the other abutment.

3. A transmission comprising a housing having a surrounding wall provided with axially spaced and inward, annular high speed, low speed and reverse abutments, an input member and an output member extending from opposite ends of the housing, respectively, variable speed means for varying the speed of the output member including high and low, internal planetary speed trains each including a sun gear, a ring gear, planet pinions and a carrier for the pinions, the high speed carrier being connected to the ring gear of the low speed train and the ring gear of the high speed train being connected to the carrier of the low speed train, the latter carrier connecting with the output member, high and low speed, annular and selectively engageable brakes carried by the transmission wall in surrounding and substantially coplanar relation to the associated speed trains, separate annular channel means connecting each of the brakes with the corresponding sun gear and partly housing the associated speed train, a spur planetary gear train positioned forwardly of the high speed train including an input sun gear and an output sun gear respectively connected to the input member and to the high speed carrier, sleeve planet pinions meshing at one end with the input sun gear, idler gears meshing with the opposite ends of the sleeve pinions and the output sun gear, and an annular carrier in which the sleeve pinions and idler gears are mounted and partly housed, and a forward clutch and a reverse brake respectively hydraulically actuated and selectively engageable to respectively cause the spur train carrier to rotate with the input sun gear and to hold the spur train carrier against rotation to thereby provide forward or reverse drive through that speed train whose brake is engaged, the forward clutch including an annular cylinder journaled in the housing and connected to the spur train carrier and an annular, clutch engaging piston slidable in the cylinder and the reverse brake surrounding the spur train in substantially coplanar relation thereto and being carried by the transmission wall, the high and low speed brakes comprising annular friction plates respectively slidably connected to the wall and the associated channel means and engageable to grip the respective plates thereof against the high and low speed abutments, respectively, and the reverse brake comprising friction plates respectively slidably connected to the wall and the spur train carrier and engageable to grip the plates thereof against the reverse abutment.

4. A transmission comprising a housing having a surrounding wall provided with an inward, annular abutment, an input member and an output member extending from opposite ends of the housing, respectively, a spur planetary gear train including an input sun gear connected to the input member, an output sun gear, means connecting the output sun gear to the output member, sleeve planet pinions meshing at one end with the input sun gear, idler gears meshing with the opposite ends of the sleeve pinions and the output sun gear, and an annular carrier in which the sleeve pinions and idler gears are mounted and partly housed, and a forward clutch and a reverse brake respectively hydraulically actuated and selectively engageable to respectively cause the spur train carrier to rotate with the input sun gear to provide forward drive to the output member and to hold the spur train carrier against rotation to provide reverse drive to the output member, the forward clutch including an annular cylinder journaled in the housing and connected to the spur train carrier, an annular clutch engaging piston slidable in the cylinder and a driven member connected to the input sun gear, and the reverse brake surrounding the spur train in substantially coplanar relation thereto and being carried by the transmission wall, the reverse brake comprising friction plates respectively slidably connected to the wall and the spur train carrier and engageable to grip the brake plates against the abutment.

References Cited in the file of this patent

UNITED STATES PATENTS

| | | |
|---|---|---|
| 1,832,467 | Nabstedt | Nov. 17, 1931 |
| 1,918,775 | Nabstedt | July 18, 1933 |
| 2,215,627 | Walter | Sept. 24, 1940 |
| 2,251,625 | Hale | Aug. 5, 1941 |
| 2,354,257 | Greenlee | July 25, 1944 |
| 2,418,378 | Voytech | Apr. 1, 1947 |
| 2,531,996 | Voytech | Nov. 28, 1950 |
| 2,544,542 | Palen | Mar. 6, 1951 |
| 2,620,685 | Smirl | Dec. 9, 1952 |
| 2,651,950 | Schou | Sept. 15, 1953 |
| 2,667,085 | Ackerman | Jan. 26, 1954 |
| 2,672,767 | Schneider | Mar. 23, 1954 |
| 2,675,102 | Robinson | Apr. 13, 1954 |
| 2,741,130 | Gerst | Apr. 10, 1956 |

FOREIGN PATENTS

| | | |
|---|---|---|
| 469,881 | Great Britain | Aug. 3, 1937 |
| 404,627 | Italy | Aug. 5, 1943 |
| 904,417 | France | Feb. 26, 1945 |
| 600,791 | Great Britain | Apr. 19, 1948 |